(12) United States Patent
Chen et al.

(10) Patent No.: US 11,050,372 B2
(45) Date of Patent: Jun. 29, 2021

(54) POSITION-SENSORLESS CONTROL METHOD AND DEVICE FOR LONG-CABLE DRIVE PERMANENT MAGNET MOTOR

(71) Applicant: TIANGONG UNIVERSITY, Tianjin (CN)

(72) Inventors: Wei Chen, Tianjin (CN); Xinglong Sun, Tianjin (CN); Xinmin Li, Tianjin (CN); Tingna Shi, Tianjin (CN); Changliang Xia, Tianjin (CN)

(73) Assignee: TIANGONG UNIVERSITY, Tianjin (CN)

( * ) Notice: Subject to any disclaimer, the term of this patent is extended or adjusted under 35 U.S.C. 154(b) by 0 days.

(21) Appl. No.: 16/672,143

(22) Filed: Nov. 1, 2019

(65) Prior Publication Data

US 2020/0295680 A1 Sep. 17, 2020

(30) Foreign Application Priority Data

Mar. 12, 2019 (CN) .......................... 201910185772X

(51) Int. Cl.
*H02K 17/16* (2006.01)
*H02P 6/18* (2016.01)
*H02P 6/28* (2016.01)

(52) U.S. Cl.
CPC . *H02P 6/18* (2013.01); *H02P 6/28* (2016.02)

(58) Field of Classification Search
CPC ........... H02K 17/165; H02P 6/18; H02P 6/28
See application file for complete search history.

(56) References Cited

U.S. PATENT DOCUMENTS

| 5,559,419 A * | 9/1996 | Jansen | H02K 17/165 |
| | | | 318/804 |
| 2016/0173018 A1* | 6/2016 | Nondahl | H02P 6/28 |
| | | | 318/400.02 |

\* cited by examiner

*Primary Examiner* — Cortez M Cook
(74) *Attorney, Agent, or Firm* — Dragon Sun Law Firm, PC; Jinggao Li, Esq.

(57) ABSTRACT

A position-sensorless control method and device for long-cable drive permanent magnet motors, including: adding a coupling circuit after boost transformers in the long-cable drive circuit of a permanent magnet motor; coupling three high frequency detection signals with different frequencies into a power supply cable and windings of the motor through three coupling transformers in the coupling circuit respectively; obtaining high frequency voltage components on primary windings of the coupling transformers by bandpass filters; obtaining the position signals according to relations among effective values of the high frequency voltage components; and finally realizing the position-sensorless control of the motor by a controller according to the obtained position signals.

8 Claims, 5 Drawing Sheets

POSITION-SENSORLESS CONTROL METHOD AND DEVICE FOR LONG-CABLE DRIVE PERMANENT MAGNET MOTOR

CROSS-REFERENCE TO RELATED PATENT APPLICATION

This application claims priority to and the benefit of CN 201910185772X, filed Mar. 12, 2019, entitled "POSITION-SENSORLESS CONTROL METHOD AND DEVICE FOR LONG-CABLE DRIVE PERMANENT MAGNET MOTOR," by Wei CHEN et al. The entire disclosure of the above-identified application is incorporated herein by reference.

Some references, which may include patents, patent applications, and various publications, are cited and discussed in the description of the present invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The invention relates to a drive of a permanent magnet motor, and in particular to a position-sensorless control method and device for a long-cable drive permanent magnet motor.

BACKGROUND OF THE INVENTION

Permanent magnet motor is widely used in industry because of its high-power density, high output torque and high efficiency. As for petroleum industry, it is a trend to replace induction motors with permanent magnet motors in order to increase efficiency, reduce energy consumption and shrink the overall size of the motors. As the motors used in electric submersible pump (ESP) are far from the work platform during operation, the permanent magnet motors are connected with the converters through long cables. Considering the cables $I^2R$ losses, step-up transformers are employed to boost the voltage and reduce the current. In order to suppress the voltage reflection and overvoltage in the cables, sine-wave filters or LC filters are needed. Because of the long cables, transformers and sine-wave filters, it is difficult to obtain the necessary position signal for the permanent magnet motors, and the traditional position-sensorless control methods are also difficult to apply, especially in standstill or low speed.

Due to the lack of an effective position-sensorless control method at static or low speed, only an improved open-loop control method can be used to drive permanent magnet motors in industrial applications (U.S. patent Ser. Nos. 13/868,216, 14/565,781). Because the load torque of submersible electric pump is large and changing dramatically during startup, the submersible electric pump driven by permanent magnet motor often suffers from out-of-step failure.

In the traditional inductance position-sensorless control method, a high frequency detection signal is generated by a power switch. But in the long-cable drive permanent magnet motor, the high frequency detection signal generated by the power switch is greatly suppressed when passing through the boost transformer in the circuit. Most of the energy contained in the detection signal is consumed in the transformer and sine-wave filter, while little energy flow in the motor winding, and no position signal of the rotor obtained.

Frequency Division Multiplexing (FDM) technology is one of the commonly used technologies in communication engineering, which divides the channel of transmitting information into several non-overlapping sub-channels. Each signal occupies one of the frequency bands, and multi-channel signals are separated at the receiving terminal by using appropriate bandpass filters so as to recover the required signals.

Therefore, a heretofore unaddressed need exists in the art to address the aforementioned deficiencies and inadequacies.

SUMMARY OF THE INVENTION

The objectives of the present invention are to provide a position-sensorless control method and device for long-cable drive permanent magnet motor, which can expand the speed regulation range of the motor and improve the position detection accuracy.

The technical scheme adopted by the present invention is as follows: a position-sensorless control method for long-cable drive permanent magnet motor, wherein a coupling circuit is added between the transformer and the permanent magnet motor, and high frequency detection signals with different frequencies are coupled into the power supply cable and windings of the motor through three coupling transformers in the coupling circuit, respectively, and then high-frequency response voltage components in primary windings of the three coupling transformers are obtained through bandpass filters, and finally the position signals are obtained according to relations among effective values of the high frequency voltage components. The controller can realize the position-sensorless control of the motor according to the position signals.

The high frequency detection signals are generated by independent signal sources, and the high frequency detection signals and the main driving PWM power are frequency division multiplexed within the power cable and the permanent magnet motor windings.

A high frequency signal wave trapper is provided between the boost transformer and the injection point of the high frequency detection signals so as to avoid part of the high frequency signal entering the power grid and the inverter through the boost transformer, so that the high frequency signal will not be affected by the power grid and the inverter.

A device for realizing the position-sensorless control method for long cable drive permanent magnet motor includes a power source, an inverter, three sine-wave filters, three coupling transformers, a long-cable and a permanent magnet motor, all of which are connected in series. The inverter is driven by a controller. A coupling circuit, coupling the high frequency detection signal circuit with the main power circuit, is arranged between the boost transformer and the cable. An input terminal of the coupling circuit is connected to high frequency detection signals which frequency is set by the controller, and an output terminal of the coupling circuit is connected to the controller by a bandpass filter to provide the high frequency voltage component of the three-phase circuit.

Each of the three-phase output terminals of the secondary winding of the boost transformer is respectively provided with a high frequency signal wave trapper, so that the difference of the high frequency voltage components at each phase is not affected by the power grid and the power switch.

Each of the high frequency signal wave trappers consists of inductors and capacitors connected in parallel. One terminal of the trapper is connected with one phase of the secondary winding of the boost transformer, and the other terminal is connected with one phase of the cable.

The coupling circuit includes three sets of coupling transformer circuits, in which a first set of the coupling transformer circuit includes a first transformer, and one terminal of the secondary winding of the first transformer is connected to a phase A of the three-phase voltage, and the other terminal is connected to a phase B of the three-phase voltage through a first capacitor. A second set of the coupling transformer circuit includes a second transformer, one terminal of the secondary winding of the second transformer is connected to a phase C of the three-phase voltage, and the other terminal is connected to the phase A through the second capacitor. The third set of the coupling transformer circuit includes a third transformer, one terminal of the secondary winding of the third transformer is connected with the phase B of the three-phase voltage, and the other terminal is connected with the phase C of the three-phase voltage through a third capacitor. The signal source includes a first signal source connected to a primary winding of the first transformer, a second signal source connected to a primary winding of the second transformer and a third signal source connected to a primary winding of the third transformer. The bandpass filter comprises a first bandpass filter and a second bandpass filter (102) respectively connected to the primary winding of the first transformer, and a third bandpass filter and a fourth bandpass filter respectively connected to the primary winding of the second transformer, and the fifth bandpass filter and the sixth bandpass filter respectively connected to the primary winding of the third transformer.

The first bandpass filter and the sixth band-pass filter have the same passband as $\Delta f_2$, and the second bandpass filter and the fourth bandpass filter have the same passband as $\Delta f_3$, and the third band-pass filter and the fifth band-pass filter have the same passband as $\Delta f_1$, and $\Delta f_1$, $\Delta f_2$ and $\Delta f_3$ do not cross each other.

The position-sensorless control method and device for long-cable drive permanent magnet motor of the present invention have the following beneficial effects:

1. The invention overcomes the defects of poor control effect of back EMF method at low speed and zero speed and the shortage that traditional inductance method can not be used in long-cable drive motor, enlarges the speed regulation range of motor, and improves the accuracy of rotor position detection.

2. The high frequency signals of three frequencies can be coupled into the circuit simultaneous, and the high frequency voltage components of different frequencies in each phase terminal voltage can be obtained in real time by bandpass filters. By comparison, the rotor position of the permanent magnet motor can be obtained in real time, which facilitates more accurate control of the permanent magnet motor.

3. The coupling circuit of the invention is not only the channel through which the high frequency detection signal enters the power supply cable of the motor, but also the channel through which the high frequency component of the voltage at the motor terminal enters the bandpass filter, thereby avoiding the use of the voltage sensor and reducing the system cost and the system volume.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

The numerals are:
1: Inverter 2: Sine-wave Filter;
3: Boost Transformer 4: High Frequency Signal Wave Trapper;
5: Long Cable 6: Permanent Magnet Motor;
7: Coupling circuit 8: Controller;
9: Signal Source 91: First Signal Source;
92: Second Signal Source 93: Third Signal Source;
10: Bandpass filter 101: First Bandpass Filter;
102: Second Bandpass Filter 103: Third Bandpass Filter;
104: Fourth Bandpass Filter 105: Fifth Bandpass Filter; and
106: Sixth Bandpass Filter 11: Power Supply.

DETAILED DESCRIPTION OF THE INVENTION

The invention will be described in detail below with reference to the drawings in conjunction with the embodiments.

The position-sensorless control method for long-cable drive permanent magnet motor of the present invention is as follows: adding a coupling circuit after boost transformers in the long-cable drive circuit of a permanent magnet motor, and coupling three high-frequency detection signals with different frequencies into the power supply cable and windings of the motor through three coupling transformers in the coupling circuit respectively; obtaining the high frequency voltage components on primary windings of the three coupling transformers by a bandpass filter, and obtaining the position signals according to relations among effective values of the high frequency voltage components; and finally realizing the position-sensorless control of the motor by the controller according to the obtained position signals.

The high frequency detection signal is generated by an independent signal source, and high frequency detection signal and main power loop are frequency division multiplexed with the cable and winding of the permanent magnet motor power.

A high frequency signal wave trapper between the boost transformer and the injection point of the high frequency detection signal so as to avoid part of the high frequency signal entering the power grid and an inverter through the boost transformer, so that the difference of the high frequency voltage components at each phase is not affected by the power grid and the power switch.

Figure 1:
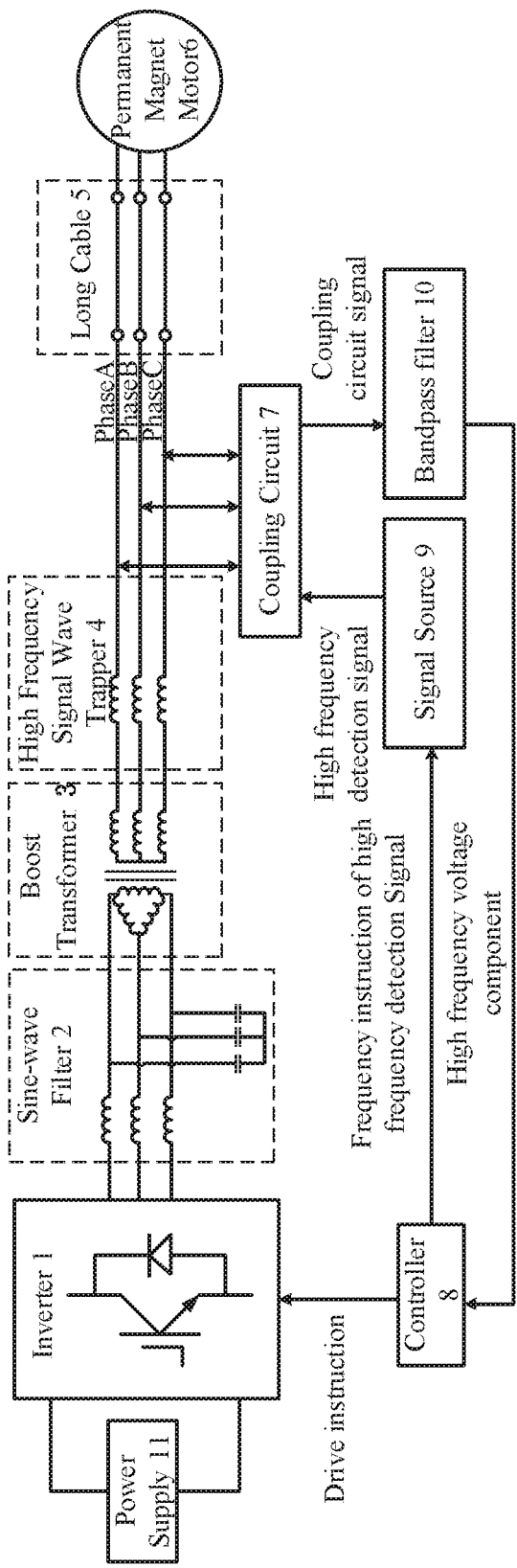
FIG. 1 is a block diagram of a position-sensorless control device for long-cable drive permanent magnet motor of the present invention.

As shown in FIG. 1, a device for realizing the position-sensorless control method for long-cable drive permanent magnet motor of the present invention includes an inverter 1, a sine-wave filter 2, transformers 3, a long cable 5 and a permanent magnet motor 6, which are connected in series; and the signal input terminal of the inverter 1 is connected with a controller 8 for providing driving instructions, and a power input terminal of the inverter 1 is connected with a power supply 11. A coupling circuit 7, providing high frequency detection signals to the permanent magnet motor 6 and acquiring high-frequency voltage components of three-phase output terminals of a secondary winding of the transformer 3, is arranged between three-phase output terminals of the secondary winding of the transformer 3 and three-phase input terminals of the long cable 5. The input terminal of the coupling circuit 7 is connected to the controller 8 by a signal source 9 to obtain frequency instructions of high frequency detection signals, and an output terminal of the coupling circuit 7 is connected to the controller 8 by the bandpass filter to provide the high frequency voltage component of the three-phase output terminals of the secondary winding of the transformer 3 to the controller 8.

The three-phase output terminals of the secondary winding of the transformer 3 is respectively provided with a high frequency signal wave trapper 4 for making the difference of the high frequency voltage components at each phase unaffected by the power grid and the inverter.

Figure 2:
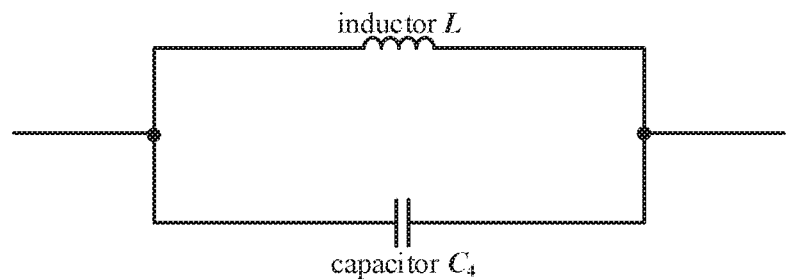
FIG. 2 is a circuit schematic diagram of a high frequency signal wave trapper in the device of the present invention.

As shown in FIG. 2, each high frequency signal wave trapper 4 is composed of an inductor L and a fourth capacitor $C_4$ connected in parallel. One terminal of the high frequency signal wave trapper is connected with one phase output terminal of the three-phase output terminals of the secondary winding of the transformer 3, and the other terminal is connected with one phase of the input terminal of the long cable 5 and the coupling circuit 7.

Figure 3:
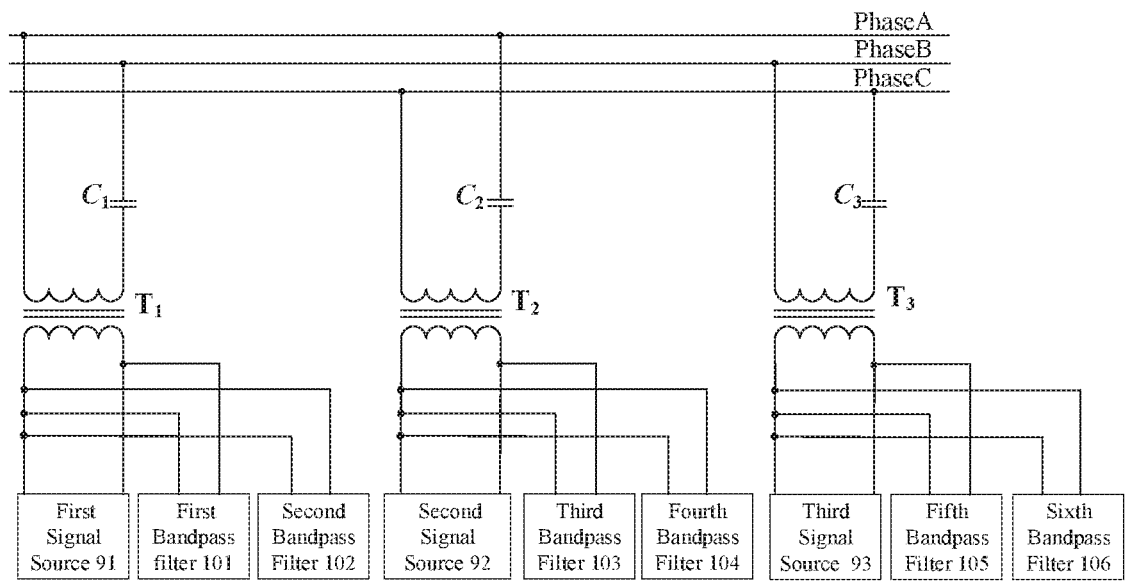
FIG. 3 is a schematic diagram of the device including coupling circuits, signal sources and bandpass filters of the present invention.

As shown in FIG. 3, the coupling circuit 7 includes three sets of transformer circuits, in which a first set of transformer circuit includes a first coupling transformer T1, and one terminal of the secondary winding of the first coupling transformer T1 is connected to a phase A of the three-phase voltage, and the other terminal is connected to a phase B of the three-phase voltage through the first capacitor $C_1$. The second set of the transformer circuit includes a second coupling transformer T2, one terminal of the secondary winding of the second coupling transformer T2 is connected to a phase C of the three-phase voltage, and the other terminal is connected to the phase A through the second capacitor $C_2$. The third set of transformer circuit includes a third coupling transformer T3, one terminal of the secondary winding of the third coupling transformer T3 is connected with the phase B, and the other terminal is connected with the phase C through the third capacitor $C_3$. The signal source 9 includes a first signal source 91 connected to a primary winding of the first coupling transformer T1, a second signal source 92 connected to a primary winding of the second coupling transformer T2 and a third signal source 93 connected to a primary winding of the third coupling transformer T3. The bandpass filter 10 comprises a first bandpass filter 101 and a second bandpass filter 102 respectively connected to the primary winding of the first coupling transformer T1, and a third bandpass filter 103 and a fourth bandpass filter 104 respectively connected to the primary winding of the second coupling transformer T2, and a fifth bandpass filter 105 and a sixth bandpass filter 106 respectively connected to the primary winding of the third coupling transformer T3.

The first bandpass filter 101 and the sixth bandpass filter 106 have the same passband as $\Delta f_2$, and the second bandpass filter 102 and the fourth bandpass filter 104 have the same passband as $\Delta f_3$, and the third bandpass filter 103 and the fifth bandpass filter 105 have the same passband as $\Delta f_1$, and $\Delta f_1$, $\Delta f_2$ and $\Delta f_3$ do not cross each other.

Figure 4:
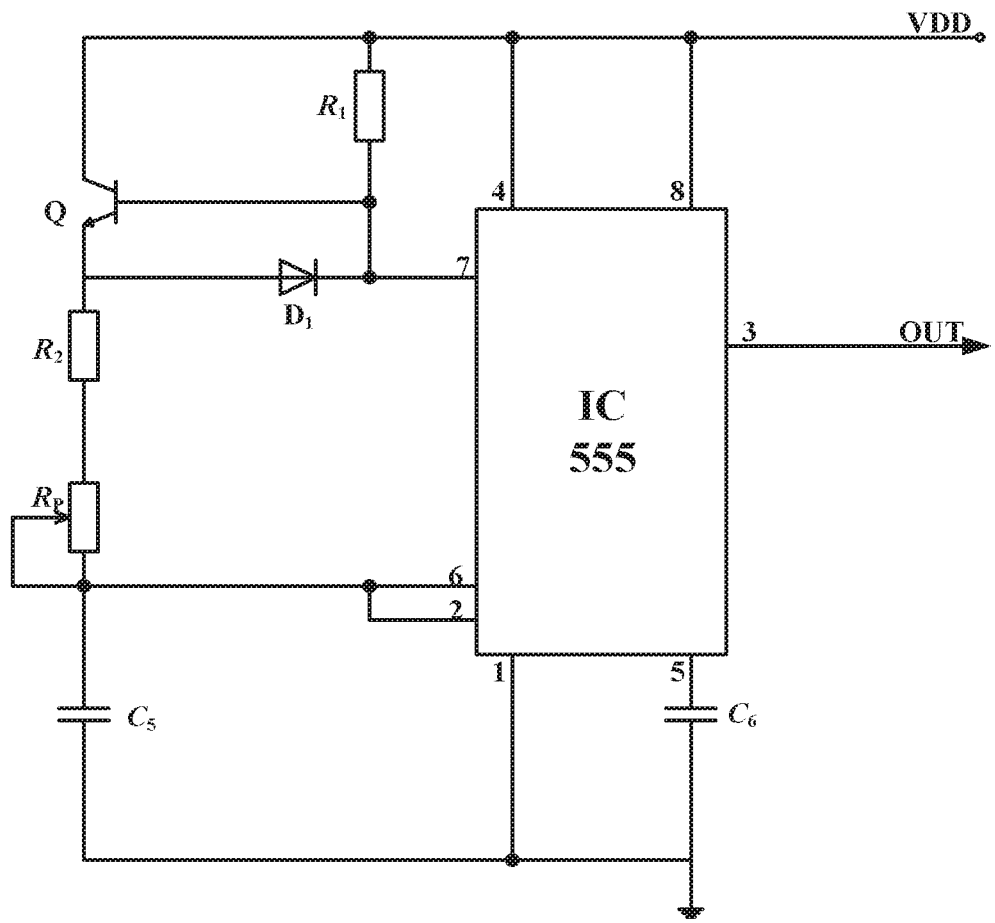
FIG. 4 is a circuit schematic diagram of a signal source in the device of the present invention.

Chips of type AD9834, AD9951 and AD9951 can be used in the high frequency signal source 9. FIG. 4 shows a circuit structure of high frequency signal source 9.

Chips of type CF61A4801C, CF61A8001C and CF61A8701 can be used in the first bandpass filter to the sixth bandpass filter 101, 102, 103, 104, 105, 106.

As shown in FIG. 1, the motor is a permanent magnet motor driven by the long cable. It can be seen from the figure that an injection system of the independent high frequency detection signal provided on the output side of the boost transformer 3 on the power transmission line. The high frequency detection signal injection system consists of the high frequency signal source 9 and the coupling circuit 7. The high frequency detection signal is generated by the high frequency signal source 9 in a fixed frequency form, and the high frequency signal generated by the high frequency signal source 9 is transmitted directly to the power line of the permanent magnet motor through the coupling circuit 7. Since the high frequency signal wave trapper 4 and the boost transformer 3 are provided between the injection point of the high frequency detection signal and the inverter 1, the high frequency detection signal cannot enter the inverter 1 and the power grid, thus avoiding the detection error caused by the inverters 1 and the power grid.

The coupling circuit transmits the high frequency detection signal to the power line of the permanent magnet motor and avoids the low frequency signal entering the high frequency signal source 9. FIG. 2 shows a coupling circuit. Three high frequency detection signals enter the power line through three coupling transformers in the coupling circuit; and meanwhile, the high frequency component of the terminal voltage in the power line also enters the bandpass filter through the secondary and primary windings of three coupling transformers in the coupling circuit. FIG. 2 shows a high frequency signal wave trapper consisting of an inductance coil and a capacitor. FIG. 4 shows a high frequency signal source circuit, which can generate a fixed high frequency signal with an output frequency of $f=1/[1.278 (R_2+R_P)C_1]$. It can be seen that the frequency of the high frequency signal depends on the values of resistors $R_2$, $R_P$ and capacitor $C_1$.

Figure 5A:
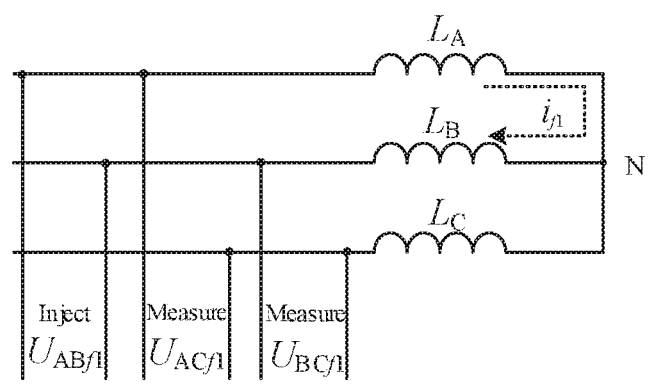
FIG. 5a is a schematic diagram showing the comparison of the winding inductance values of phase A and phase B.
Figure 5B:
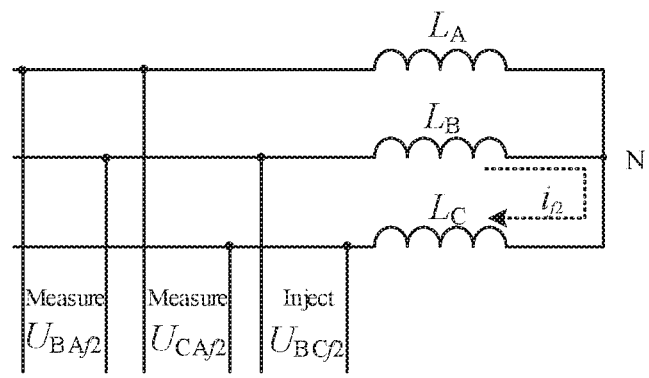
FIG. 5b is a schematic diagram showing the comparison of the winding inductance values of phase B and phase C.
Figure 5C:
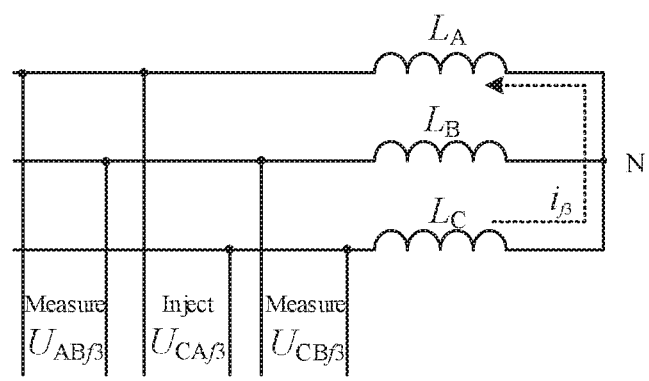
FIG. 5c is a schematic diagram showing the comparison of the winding inductance values of phase C and phase A.
Figure 6:
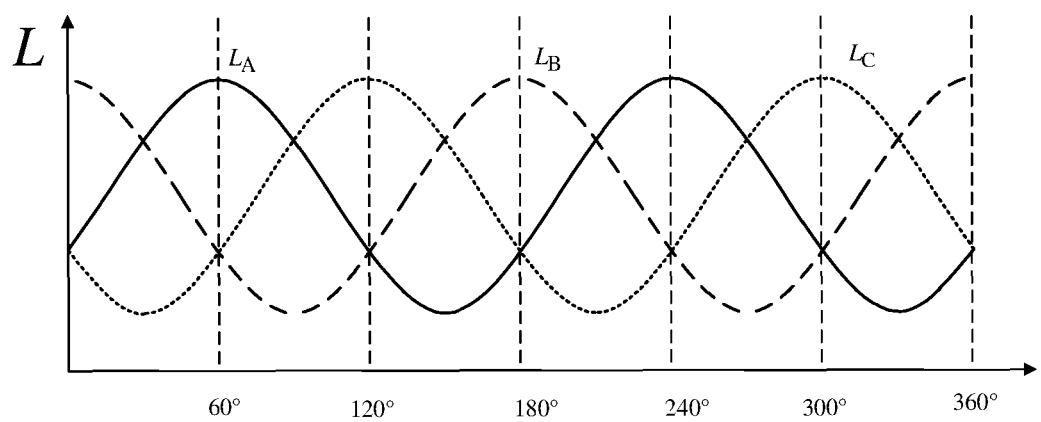
FIG. 6 shows the corresponding relationship between the difference of three-phase windings and the position of the rotor.

Taking a sinusoidal permanent magnet motor as an example, as shown in FIG. 2, the high frequency signal source 9 injects three high frequency detection signals with different frequencies into the three-phase power supply line of the permanent magnet motor through the coupling circuit 7. Since the power frequency back EMF can be filtered through the bandpass filter 10, according to the calculation formula of inductive reactance of $X_L=2\pi f L$, the inductive reactance is large when the signal frequency is high, and winding resistance voltage can be ignored. FIG. 5(a) is the high frequency equivalent circuit diagram of the permanent magnet motor in the passband $\Delta f_1$. The high frequency detection signal $U_{ABf1}$ with frequency of $f_1$ is injected between the phase A and phase B; meanwhile, the inductance of the phase A and the phase B windings divide the high frequency voltage component $U_{ABf1}$ according to the inductance values, and since the phase C has no high frequency detection signal with the frequency $f_1$, it is considered as a short circuit in the high frequency equivalent circuit of the permanent magnet motor. So the voltages at both terminals of phase AC and phase BC are the terminal voltages of the phase A and phase B. The relationship between $L_A$ and $L_B$ can be obtained by comparing voltages $U_{ACf1}$ and $U_{BCf1}$. Similarly, as shown in FIG. 5 (b), the high frequency detection signal $U_{BCf2}$ with frequency $f_2$ is injected between the phase B and phase C. The relationship between $L_B$ and $L_C$ can be obtained by comparing the voltages $U_{BAf2}$ and $U_{CAf2}$. As shown in FIG. 5 (c), the high frequency detection signal $U_{CAf3}$ with frequency $f_3$ is injected between phase C and phase A. The relationship between $L_A$ and $L_C$ can be obtained by comparing the voltages $U_{ABf3}$ and $U_{CBf3}$. Therefore, the relationship between the three-phase inductance can be judged in real time. According to the relationship between the three-phase windings and the rotor position shown in FIG. 6, the absolute position of the rotor can be obtained, and the controller 8 controls the motor to run steadily according to the absolute position signal of the rotor.

The present invention can be applied to the detection of rotor position of the permanent magnet motor under arbitrary operation state. The inductance difference of each phase of the permanent magnet motor at different rotor positions does not depend on the motion of the motor rotor, and the inductance difference of each phase can also be obtained when the rotor is stationary. During zero-speed starting process of the motor, the high frequency detection signal injection system is first started in the starting process, the high frequency detection signal is injected into the power line of the permanent magnet motor to obtain the relationship among the inductance of three-phase windings. According to the relationship between the inductance of each phase winding and the position of the rotor shown in FIG. 6, the initial position of the rotor is found out, and then the controller sends a driving pulse instruction to start acceleration, and the vector control or commutation control of the permanent magnet motor can be performed according to the rotor position obtained by the high frequency detection signal during the acceleration process.

Although the functions and working processes of the present invention have been described above with reference to the accompanying drawings, the present invention is not limited thereto. The foregoing specific implementations are merely illustrative but not limiting. A person of ordinary skill in the art may make various forms under the teaching of the present invention without departing from the purpose of the present invention and the protection scope of the appended claims, and all the forms shall fall into the protection scope of the present invention.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A position-sensorless control method for a long-cable drive permanent magnet motor, comprising:
    adding a coupling circuit after a boost transformer in the long-cable drive circuit of the permanent magnet motor comprising a rotor;
    coupling three high frequency detection signals with different frequencies into a power supply cable and three-phase windings of the motor through three coupling transformers in the coupling circuit respectively;
    obtaining high frequency voltage components on primary windings of the three coupling transformers by band pass filters;
    obtaining relations of three-phase inductances of the three-phase windings according to relations among effective values of the high frequency voltage components;
    obtaining position signals of the rotor with the relations of the three-phase inductances according to relationships between three-phase inductances and positions of the rotor, and finally realizing the position-sensorless control of the motor by a controller according to the obtained position signals.

2. The position-sensorless control method according to claim 1, wherein the high frequency detection signal is generated by an independent signal source, and the high frequency detection signal and a main power loop are frequency division multiplexed with the cable and windings of the permanent magnet motor power.

3. The position-sensorless control method according to claim 1, wherein a high frequency signal wave trapper is provided between the boost transformer and an injection point of the high frequency detection signal so as to avoid part of the high frequency signal entering the power grid and an inverter through the boost transformer, so that the difference of the high frequency voltage components at each phase is not affected by the power grid and the power switch.

4. A device for realizing the position-sensorless control method according to claim 1, including
    the inverter, a sine-wave filter, boost transformers, a long cable and a permanent magnet motor, which are connected in series;
    the signal input terminal of the inverter is connected with the controller for providing driving instructions, and a power input terminal of the inverter is connected with a power supply; wherein a coupling circuit, providing high frequency detection signals to the permanent magnet motor and acquiring high frequency voltage components of three-phase output terminals of a secondary winding of the boost transformer, is arranged between three-phase output terminals of a secondary winding of the transformer and three-phase input terminals of the long cable; and
    an input terminal of the coupling circuit is connected to the controller by a signal source to obtain frequency instructions of the high frequency detection signals; and
    an output terminal of the coupling circuit is connected to the controller by a bandpass filter to provide the high frequency voltage components of the three-phase output terminals of the secondary winding of the boost transformer to the controller.

5. The device according to claim 4, wherein each of the three-phase output terminals of the secondary winding of the boost transformer is respectively provided with a high frequency signal wave trapper for making the difference of the high frequency voltage components at each phase unaffected by the power grid and the inverter.

6. The device according to claim 5, wherein each high frequency signal wave trapper is composed of an inductor and a fourth capacitor connected in parallel; one terminal of the high frequency signal wave trapper is connected with one phase output terminal of the three-phase output terminals of the secondary winding of the transformer, and the other terminal is connected with one phase of the input terminal of the long cable and the coupling circuit.

7. The device according to claim 4, wherein the coupling circuit includes three sets of coupling transformer circuits, in which a first set of transformer circuit includes a first transformer, and one terminal of the secondary winding of the first transformer is connected to a phase A of the three-phase voltage, and the other terminal is connected to a phase B of the three-phase voltage through the first capacitor; the second set of the transformer circuit includes a second transformer, one terminal of the secondary winding of the second transformer is connected to a phase C of the three-phase voltage, and the other terminal is connected to the phase A through the second capacitor;

the third set of transformer circuit includes a third transformer, one terminal of the secondary winding of the third transformer is connected with the phase B, and the other terminal is connected with the phase C through the third capacitor;

the signal source includes a first signal source connected to a primary winding of the first transformer, a second signal source connected to a primary winding of the second transformer and a third signal source connected to a primary winding of the third transformer; and the bandpass filter comprises a first bandpass filter and a second bandpass filter respectively connected to the primary winding of the first transformer, and a third bandpass filter and a fourth bandpass filter respectively connected to the primary winding of the second transformer, and a fifth bandpass filter and a sixth bandpass filter respectively connected to the primary winding of the third transformer.

8. The device according to claim 7, wherein the first bandpass filter and the sixth band-pass filter have the same passband as $\Delta f_2$, and the second bandpass filter and the fourth bandpass filter have the same passband as $\Delta f_3$, and the third band-pass filter and the fifth band-pass filter have the same passband as $\Delta f_1$, and $\Delta f_1$, $\Delta f_2$ and $\Delta f_3$ do not cross each other.

* * * * *